(12) United States Patent
Roger et al.

(10) Patent No.: US 9,554,521 B2
(45) Date of Patent: Jan. 31, 2017

(54) DISTRIBUTION MACHINE

(71) Applicant: KUHN-AUDUREAU S.A., La Copechagniere (FR)

(72) Inventors: Christophe Roger, Nantes (FR); Charly Garnier, Saint Philibert de Bouaine (FR)

(73) Assignee: KUHN-AUDUREAU S.A., La Copechagniere (FR)

(*) Notice: Subject to any disclaimer, the term of this patent is extended or adjusted under 35 U.S.C. 154(b) by 184 days.

(21) Appl. No.: 14/413,036

(22) PCT Filed: Jul. 9, 2013

(86) PCT No.: PCT/FR2013/051638
§ 371 (c)(1),
(2) Date: Jan. 6, 2015

(87) PCT Pub. No.: WO2014/009651
PCT Pub. Date: Jan. 16, 2014

(65) Prior Publication Data
US 2015/0189837 A1    Jul. 9, 2015

(30) Foreign Application Priority Data

Jul. 12, 2012 (FR) .................................... 12 56743

(51) Int. Cl.
| | |
|---|---|
| *B02C 21/02* | (2006.01) |
| *A01F 29/09* | (2010.01) |
| *A01F 29/00* | (2006.01) |
| *A01F 29/02* | (2006.01) |
| *A01K 5/00* | (2006.01) |

(52) U.S. Cl.
CPC ........... *A01F 29/095* (2013.01); *A01F 29/005* (2013.01); *A01F 29/025* (2013.01); *A01K 5/001* (2013.01); *B02C 21/02* (2013.01)

(58) Field of Classification Search
CPC .... A01F 29/095; A01F 29/025; A01F 29/005; A01K 5/001; B02C 21/02
USPC ......................................................... 241/605
See application file for complete search history.

(56) References Cited

FOREIGN PATENT DOCUMENTS

| | | |
|---|---|---|
| EP | 2 436 261 | 4/2012 |
| FR | 2 598 059 | 11/1987 |
| FR | 2 741 777 | 6/1997 |

OTHER PUBLICATIONS

U.S. Appl. No. 14/410,318, filed Dec. 22, 2014, Roger, et al.
International Search Report Issued Oct. 2, 2013 in PCT/FR13/051638 Filed Jul. 9, 2013.

*Primary Examiner* — Mark Rosenbaum
(74) *Attorney, Agent, or Firm* — Oblon, McClelland, Maier & Neustadt, L.L.P.

(57) ABSTRACT

A machine for distribution of products for animals, including a bucket with an opening toward a casing including a first wall adjacent to the opening and a second wall remote from the first wall, in which casing a turbine is mounted that can rotate around a rotation axis, the turbine including a disc with blades and knives. The turbine further includes a plate oriented toward the opening and remote from the disc, and a central part remote from the disc and at least one branch, the at least one branch extends from the central part in a substantially radial direction of the disc, the at least one branch of the plate is connected to the disc by two lateral closing sheets to form a bin, the at least one blade of the turbine is formed by the bin.

19 Claims, 6 Drawing Sheets

DISTRIBUTION MACHINE

The present invention relates to a machine for the distribution of products for feeding or the bedding of animals, comprising a bucket with an opening for the passage of the products toward a casing comprising a first wall adjacent to the opening and a second wall remote from the first wall, in which casing a turbine is mounted that can rotate around a rotation axis, the turbine comprising a disc with blades and knives.

On such a machine, products such as straw or hay are put into the bucket and moved toward the opening for example by means of a movable conveying band situated on the bottom of the bucket. After optionally having encountered an unraveling drum allowing a homogenous supply of the turbine and a constant supply toward it, the products pass through the opening. They next enter the casing, in which the turbine rotates at a high speed. Under the effect of that rotation, the products are moved toward a periphery of the turbine while sliding along the blades. The knives of the turbine chop the products. Through the blowing effect due in particular to the blades, the chopped products are next thrown out through a discharge chute and directed toward the ground or troughs, for example.

Known from document FR 2 598 059 A1 is a machine with a turbine comprising a hub rotating around the rotation axis, which turbine comprises blades rigidly fastened to the disc. These blades are simple plane metal sheets that extend in a radial direction of the disc. These blades comprise ends adjacent to the hub and that do not join it. Such blades suffer a lack of rigidity during the work of the machine. Knives are arranged in rows in the extension of the blades. These rows have a small width and comprise a reduced number of knives with small dimensions. When the machine is supplied with dense and/or wet and/or long stranded products, the forces exerted by such products on the blades of the rotating turbine can be quite significant. The same may be true on the knives. The design of the rows of knives does not make it possible to chop a large volume of such difficult products quickly and homogenously in the entire casing of the turbine. The deformations experienced by the disc and the blades make the turbine fragile and can generate collisions with components that cooperate with the turbine. A collision risk for example exists with counter knives cooperating with the knives of the turbine. This arrangement affects the known machine. Additionally, the operation of the latter is penalized by products that are retained by the ends of the blades adjacent to the hub, which increases the jamming risk.

Another machine known from document EP 2 436 261 A1 is according to the preamble of claim 1. On this machine, the turbine comprises a hollow central cylinder around which thin plane metal sheets, connected to said cylinder, are distributed. This hollow cylinder and these plane metal sheets extend projecting perpendicularly from the disc. This design has many hollows and sharp edges that hinder the flow of products from the center of the rotating turbine toward its periphery. Furthermore, products may easily remain jammed in these geometrical unevennesses. This is in particular the case within the hollow cylinder, or in the V-shaped hollow that separates two plane metal sheets. Accumulations of products can form an unbalance that throws the rotating turbine off balance. Each plane metal sheet is extended by a branch parallel to the disc and that carries knives. Each blade is formed by the assembly of a plane metal sheet and a corresponding branch. Such a blade has a small section and can deform easily under the effect of dense products chopped by the rotating turbine. The turbine in its entirety has insufficient rigidity, which makes it fragile and increases the risk of permanent deformation after a certain usage time.

The present invention relates to a machine that does not have the aforementioned drawbacks.

To that end, an important feature of the invention lies in the fact that the turbine comprises a plate oriented toward the opening and remote from the disc, and comprising a central part remote from the disc and at least one branch, that said at least one branch extends from the central part in a substantially radial direction of the disc, that said at least one branch of the plate is connected to the disc by two lateral closing sheets to form a bin, and that at least one blade of the turbine is formed by said bin. In this way, this blade has a significantly increased rigidity. It deforms very little when the turbine is working. Additionally, the blade can carry a wide row of knives, with a large number of large knives with a high mass. The chopping of a large volume of difficult products in the casing of the turbine is thus made quicker and more homogenous. The products arriving at the central part of the turbine are moved fluidly at least toward said blade, along which they can slide easily. The risk of seeing products accumulate on that blade is reduced.

According to an advantageous feature of the invention, the plate comprises a plurality of branches, each branch extends from the central part in a substantially radial direction of the disc, each branch of the plate is connected to the disc by two lateral closing sheets to form a bin, and each blade of the turbine is formed by said bin. In this way, the turbine in its entirety has a significantly increased rigidity. The disc and the blades deform very little when the turbine is working. Additionally, the blades can carry wide rows of knives, with a large number of large knives with a high mass. The machine according to the invention thus makes it possible to chop a large volume of difficult products quickly and homogenously in the entire casing of the turbine. The products, arriving at the central part of the plate of the rotating turbine, are moved fluidly on that plate toward blades along which they can slide easily. The risk of products building up on the turbine is reduced, and the latter therefore preserves good dynamic rotational balance.

Other features and advantages of the invention will emerge from the following description, in reference to the appended drawings, which show one non-limiting example embodiment of the machine according to the invention.

Figure 1:
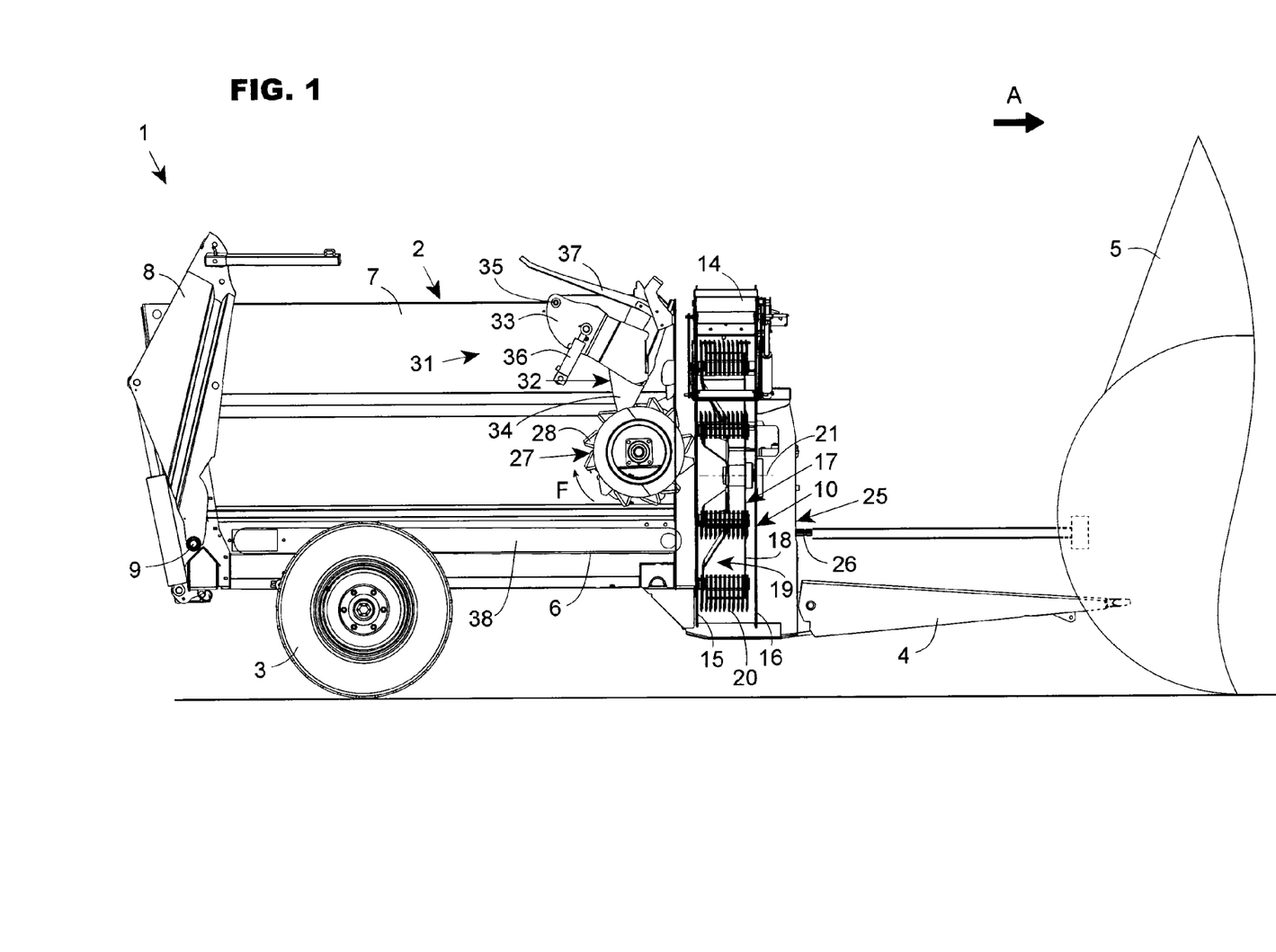
FIG. 1 shows a side view with a partial cross-section of a machine according to the invention.

As shown in FIG. 1, the machine (1) according to the invention comprises a bucket (2) with two carrier wheels (3) and a drawbar (4) for hitching to a tractor (5) used to drive the machine (1) and move it. The arrow (A) indicates the normal direction of advance of the machine (1). The indications "front" and "rear" are provided in reference to that direction of advance. The bucket (2) can advantageously be moved heightwise relative to the carrier wheels (3). This makes it possible to lower it to the ground when it is being loaded and to lift it for displacements.

The bucket (2) has a bottom (6) and two side walls (7). The rear side allows products to be loaded into the bucket (2). It can be closed by means of a panel (8) that is articulated on the bucket (2) by means of an axis (9), so as to make it possible to move the panel (8). As can be seen from FIGS. 1 and 5, the front side of the bucket (2) is formed by a casing (10) having an opening (11) oriented toward the inside of the bucket (2) for the passage of products from the bucket (2) toward the casing (10). The casing (10) also comprises an outlet orifice (12) on its perimeter (13). This outlet orifice (12) communicates with a discharge chute (14) that can be oriented to direct the flow of products. The casing (10) is in particular delimited by a first wall (15), backed onto the bucket (2) and pierced with said opening (11), and by a second wall (16), between which a turbine (17) is arranged.

Figure 5:
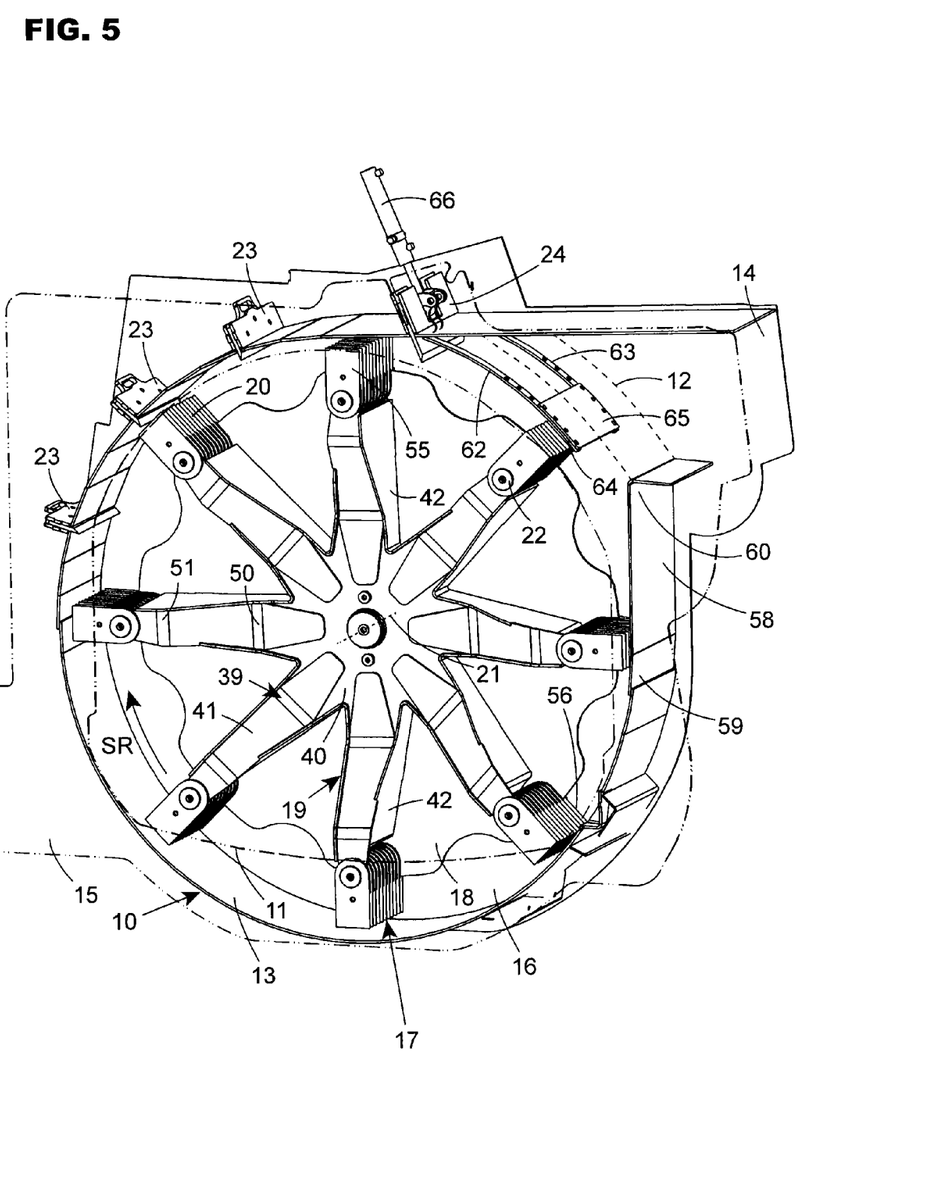
FIG. 5 shows a perspective view of the casing and of the turbine.

As shown in FIG. 5, the turbine (17) comprises a disc (18) with blades (19) and knives (20), which disc (18) is fastened on a shaft that makes it possible to drive it in rotation around a rotation axis (21) that is preferably substantially horizontal. Each blade (19) is oriented in a substantially radial direction of the disc (18). At least one part of the knives (20), in particular all of the knives (20), are pivotably mounted on at least one fastening axis (22), in particular on respective fastening axes (22). Said fastening axis or axes (22) are connected to the disc (18). At least one part of the knives (20), in particular all of the knives (20), are grouped together in at least one row, in particular in several rows. At least one fastening axis (22), in particular each fastening axis (22), is arranged in the extension of a respective blade (19). At least one part of the knives (20), in particular all of the knives (20), are arranged in the extension of at least one blade (19), in particular in the extension of the blades (19). In the event a foreign hard object is encountered, such as a stone, the knives (20) can retract by pivoting around their fastening axis (22) without being damaged. The various knives (20) preferably have a rectangular shape with large dimensions and are substantially parallel to each other. They comprise one or more cutting edges. During the rotation of the turbine (17), the knives (20) cooperate with counter knives (23, 24) arranged on the perimeter (13) of the casing (10) and shown in FIG. 5. The counter knives (23, 24) preferably have the form of vanes oriented substantially perpendicular to a rotation plane of the turbine (17) and extending from the first wall (15) to the second wall (16) of the casing (10). The machine (1) for example comprises three stationary counter knives (23) and one adjustable counter knife (24) placed, relative to the direction of rotation (SR) of the turbine (17), between the last stationary counter knife (23) and the outlet orifice (12).

A distribution gearbox (25), shown in FIG. 1, is mounted at the front part of the casing (10). It comprises an inlet (26) that can be connected to a power takeoff shaft of the tractor (5), by means of an intermediate shaft. The shaft of the turbine (17) is connected to a first outlet of said gearbox (25).

Figure 2:
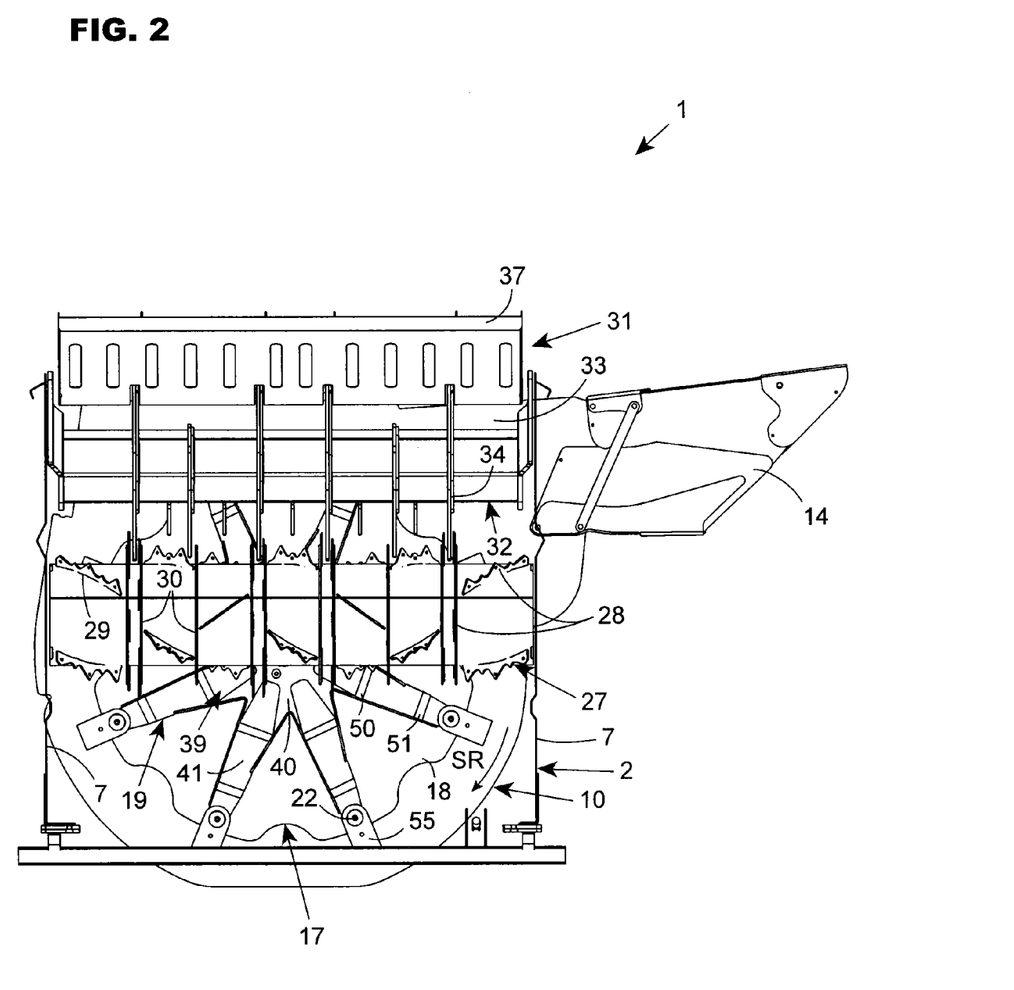
FIG. 2 shows a front view of the unraveling drum.

An unraveling drum (27) provided with knives (28) is arranged in front of the opening (11) of the casing (10). The unraveling drum (27) is thus situated between the products loaded into the bucket (2) and the turbine (17). The unraveling drum (27) is mounted between the side walls (7) and the bucket (2). At its ends, it is guided in bearings fastened to said side walls (7), so as to be able to rotate around a longitudinal geometric axis. The unraveling drum (27) is driven in rotation, for example by means of a transmission means that connect it to a second outlet of the distribution gearbox (25), or by means of a hydraulic motor. As shown by FIG. 2, the unraveling drum (27) comprises coil segments (29) on its periphery. The winding direction of each of these coil segments (29) can be reversed relative to that of the adjacent segment(s) (29). It is also possible to reverse the winding direction of the segment(s) (29) situated on one half of the length of the unraveling drum (27) relative to that of the segment(s) (29) situated on the other half of the length of the unraveling drum (27). The coil segments (29) comprise straight sections (30) that are oriented in the rotation direction (F) of the unraveling drum (27). Knives (28) are advantageously fastened on these straight sections (30).

Figure 3:
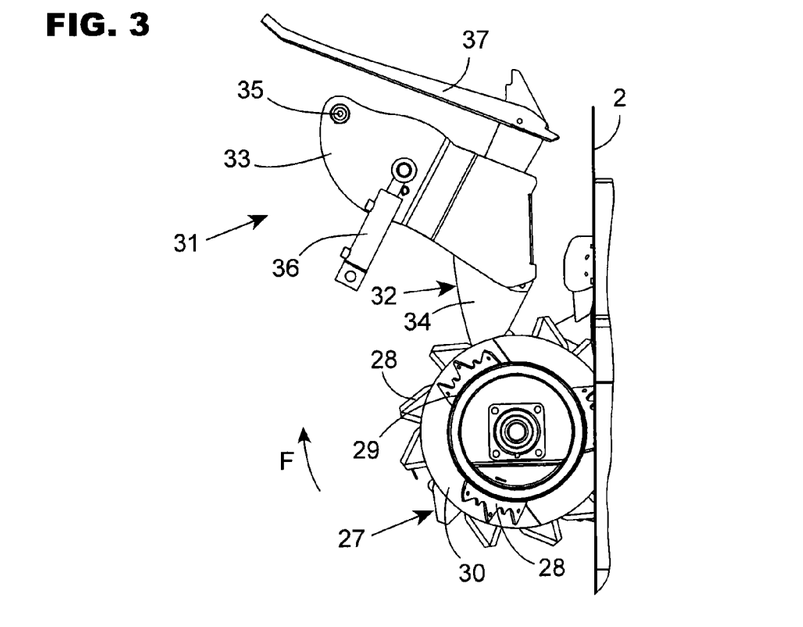
FIG. 3 shows a detailed view of an arrangement, in a first position, of the machine according to the invention.
Figure 4:
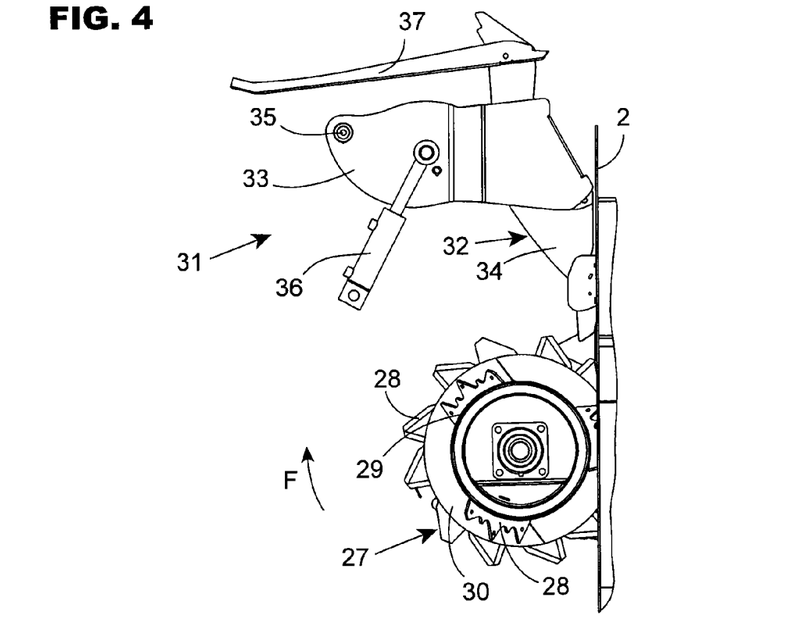
FIG. 4 shows a detailed view of the arrangement, in a second position, of the machine according to the invention.

Above the unraveling drum (27) is a regulation device (31) comprising retaining elements (32) and a deflecting wall (33). In the illustrated example, these retaining elements (32) are made up of several plates (34) that are substantially parallel to the side walls (7). They are fastened on the deflecting wall (33), which is movable relative to the unraveling drum (27), in at least two different positions. In a first position, which is shown in FIG. 3, the deflecting wall (33) is brought closer to the unraveling drum (27). The section of the passage between the deflecting wall (33) and the unraveling drum (27) is thus much larger at its rear end than at its front end. In a second position, which is shown in FIG. 4, the deflecting wall (33) is moved farther away from the unraveling drum (27). The passage between the deflecting wall (33) and the unraveling drum (27) thus has a substantially constant large section between its rear end and its front end.

The deflecting wall (33), which carries the retaining elements (32), is articulated, at its rear end, on a substantially horizontal axis (35) rigidly fastened to the side walls (7) of the bucket (2). The deflecting wall (33) is movable around said axis (35) by means of an adjustment system (36). This adjustment system (36) can for example be a hydraulic jack, which is connected on the one hand to the deflecting wall (33) itself, and on the other hand to a side wall (7) of the bucket (2). This jack is connected to the hydraulic device of the tractor (5) by pipes and can be controlled, such that it opens or closes, from the latter. It thus makes it possible to move said deflecting wall (33) into the positions previously described.

A screen (37) is articulated on the deflecting wall (33) and extends said wall (33) toward the products contained in the bucket (2). The screen (37) moves when the deflecting wall (33) is moved into its different work positions.

In the first position of the deflecting wall (33), each retaining element (32) is situated above the rear half of the unraveling drum (27) and extends into the trajectory of the knives (28). The screen (37) is brought closer to the products contained in the bucket (2).

In the second position of the deflecting wall (33), each retaining element (32) is situated above the front half of the unraveling drum (27) and extends a certain distance above the trajectory of the knives (28). The screen (37) is further moved away from the products contained in the bucket (2).

A conveying band (38) for moving the products is arranged on the bottom (6) of the bucket (2). Said band (38) is made up of a conveying band driven such that it brings the products contained in the bucket (2) to the unraveling drum (27).

The products driven by the unraveling drum (27) cross the opening (11) of the casing (10) and arrive substantially at the center of the rotating turbine (17). They then slide along the blades (19) and over the disc (18), toward the perimeter (13) of the casing (10), where they are slowed down and slightly chopped by the three stationary counter knives (23) cooperating with the knives (20) of the turbine (17). In this way, the products present along the perimeter (13) are slowed down near the stationary counter knives (23). During their travel along the perimeter (13) of the casing (10), the products are accelerated by the effect of the blades (19) and the knives (20) of the turbine (17). At the adjustable counter knife (24), the products are all the more considerably slowed down as the adjustable counter knife (24) is closer to the trajectory of the knives (20) around the rotation axis (21). The intensity of the chopping can thus be adjusted by varying the distance between the knives (20) and said adjustable counter knife (24). The products thus chopped are next thrown out through the outlet orifice (12) toward the discharge chute (14), by the blowing effect in particular due to the blades (19).

According to the invention, the turbine (17) comprises a plate (39) oriented toward the opening (11). Said plate (39) is remote from the disc (18). The plate (39) comprises a central part (40). This central part (40) is remote from disc (18). The plate (39) also comprises at least one branch (41). Said at least one branch (41) extends from the central part (40) in a direction substantially radial to the disc (18). Said at least one branch (41) of the plate (39) is connected to the disc (18) by two lateral closing sheets (42) to form a bin. At least one blade (19) of the turbine (17) is formed by said bin. In this way, the blade (19) in question has a great rigidity allowing it to absorb, with minimal deformation, significant forces generated by the chopping of dense and/or wet products, as well as those caused by the inertia of the knives (20) which, in the invention, are preferably numerous and large. The products arriving at the central part (40) of the turbine (17) are moved fluidly at least toward said blade (19), along which they can slide easily.

According to an advantageous feature of the invention, the plate (39) of the turbine (17) comprises a plurality of branches (41). Each branch (41) extends from the central part (40) in a substantially radial direction of the disc (18). Each branch (41) of the plate (39) is connected to the disc (18) by two lateral closing sheets (42) to form a bin. Each blade (19) of the turbine (17) is formed by said bin. In this way, the turbine (17) in its entirety has high rigidity. The products arriving at the central part (40) of the turbine (17) are moved fluidly toward the various blades (19) along which they can slide easily.

The knives (20) of the turbine (17) are arranged in the extension of the blades (19). Thus, the products are moved fluidly from the central part (40), along the blades (19), toward the knives (20), where they are chopped.

In order to obtain good rigidity of the bin-shaped blade (19), the lateral closing sheets (42) are preferably connected to the disc (18) and the plate (39) by welding, for example by metal deposit welding.

Figure 6:
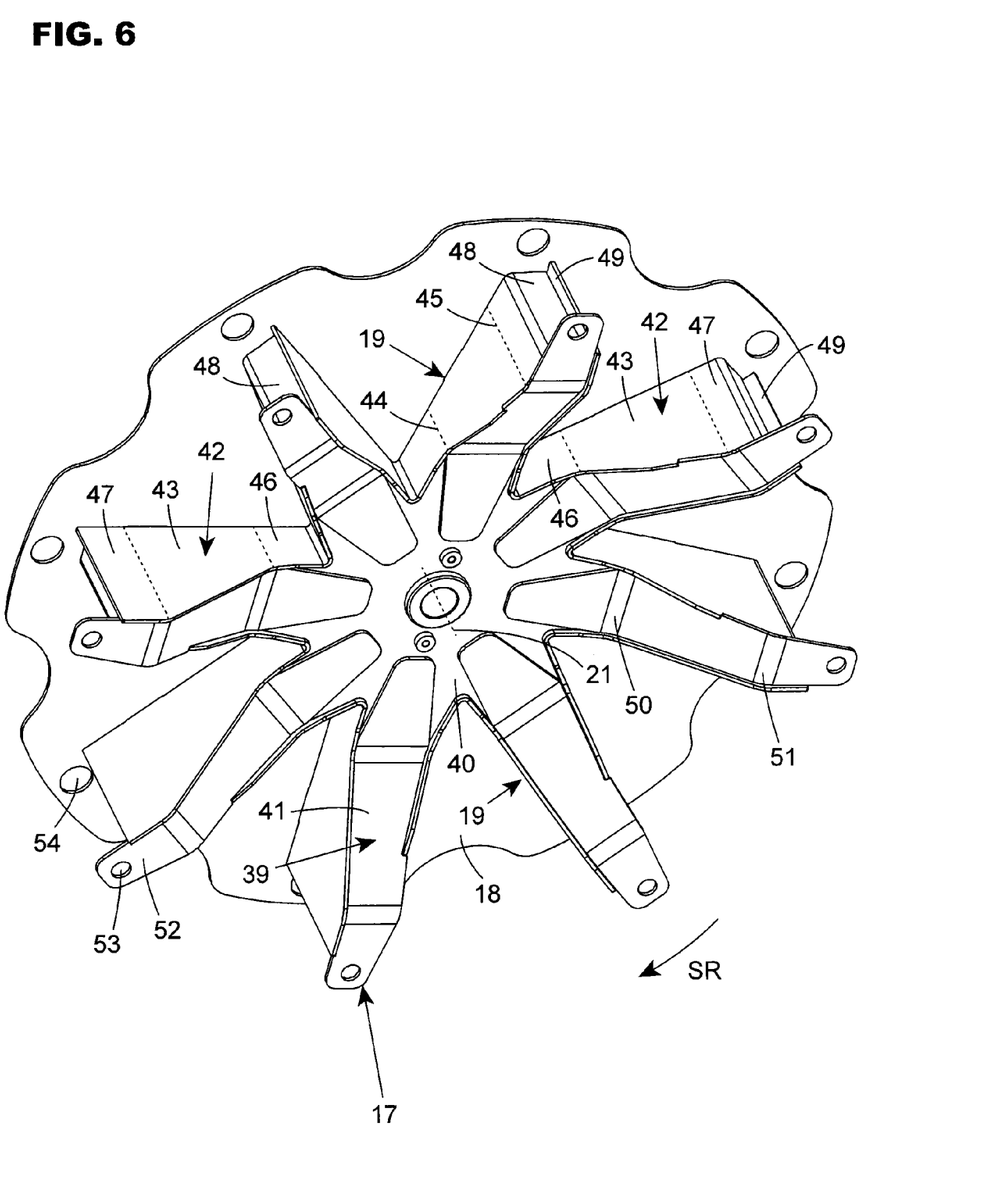
FIG. 6 shows a perspective view of the turbine without the knives.

As in particular shown by FIG. 6, each lateral closing sheet (42) advantageously comprises a portion (43) that extends on the one hand between the disc (18) and the corresponding branch (41), and on the other hand between a small width (44) adjacent to the rotation axis (21) and a large width (45) adjacent to the knives (20). The large width (45) is larger than the small width (44). Thus, the distance between the first wall (15) of the casing (10) and the central part (40) of the turbine (17) is substantially greater than between that same wall (15) and the plate (39) considered at the level of said large width (45). In this way, a significant quantity of products can penetrate the casing (10) and arrive at the center of the turbine (17), from which it next is distributed along the corresponding rotating blade (19), in particular along each respective rotating blade (19). This feature allows the machine (1) to chop a significant flow of products. Additionally, the large width (45), which is larger than the small width (44), yields a blade (19) with a relatively large section, which makes it possible to blow the products and throw them out through the discharge chute (14) at a large distance from the machine (1).

In the example embodiment in particular illustrated by FIG. 6, each portion (43) has a substantially trapezoidal shape with a large side equal to the large width (45) and a small side equal to the small width (44).

As for example shown in FIG. 6, each lateral closing sheet (42) preferably comprises an inner portion (46) situated in the extension of the portion (43). The inner portion (46) is connected to the portion (43) by a small width (44) and extends to the central part (40) of the plate (39). In the example of the figure, the central part (40) extends from the rotation axis (21) to the location where two adjacent branches (41) of the plate (39) come together. Thus, the respective inner portions (46) of two adjacent lateral closing sheets (42) form a V, at the bottom of which said inner portions (46) are connected to each other, for example by means of a weld bead. Unlike the example embodiment of FIG. 6, it could also be conceivable that a face portion, in particular circular, separates two lateral closing sheets (42) pressed against each other. In such a case, said inner portions (46) would be connected to each other by means of said face portion.

In the example of FIG. 6, each inner portion (46) is substantially rectangular.

It can further be seen on FIG. 6 that each lateral closing sheet (42) preferably comprises an outer portion (47) situated in the extension of the portion (43) and connected to the portion (43) by the large width (45).

In the example of FIG. 6, each outer portion (47) is substantially rectangular.

Each lateral closing sheet (42) comprises an end remote from the rotation axis (21). The ends of the lateral closing sheets (42) of a blade (19) are advantageously connected to each other by a closing plate (48). The bin forming this blade (19), in particular the bin forming each blade (19), is thus closed, which further increases the rigidity of that blade (19) and of the turbine (17). The closing plate (48) can be connected to one of the lateral closing sheets (42) by folding a same initial metal sheet, while the other lateral closing sheet (42) of the blade (19) can be connected to the closing plate (48) by welding.

When the turbine (17) rotates, the blades (19) move the products within the casing (10). A lateral closing sheet (42) of a blade (19) then strikes said products, said metal sheet (42) advantageously comprising an edge (49) protruding the closing plate (48). This edge (49), shown in FIG. 6, performs two functions. A first function is that the surface of the lateral closing sheet (42) comprising said edge (49) is increased. This generates a more significant blowing effect and increases the distance over which the products are thrown outside of the machine (1). Furthermore, when the knives (20) encounter a bundle of denser products, they pivot slightly around their respective fastening axes (22), in the direction opposite the rotation direction (SR) of the turbine (17). When the bundle is discharged, the knives (20), due to their inertia, this time pivot in the direction of rotation (SR) of the turbine (17) and can go well beyond an orientation radial to the disc (18). This results in significant stresses on the fastening axes (22). A second function of said edge (49) therefore consists of limiting the amplitude of this unwanted pivoting, said edge (49) forming a stop for the knives (20).

Preferably, each lateral closing sheet (42) has a completely smooth appearance. Thus, the products are moved fluidly along said metal sheet (42) without being retained by any unevenness.

According to an advantageous feature of the invention, at least one branch (41) comprises, seen from the opening (11), a concave part (50) adjacent to the central part (40) and a convex part (51) adjacent to the knives (20). This branch (41) follows the shape of the lateral closing sheets (42) designed so that a significant volume of products can cross the opening (11) of the casing (10) and be moved fluidly toward the knives (20). That branch thus participates in that fluidity, said products being able to easily slide along the branch (41).

According to another advantageous feature of the invention, each branch (41) comprises, seen from the opening (11), a concave part (50) adjacent to the central part (40) and a convex part (51) adjacent to the knives (20). In this way, the plate (39), seen from the opening (11), has a substantially concave shape. These branches (41) follow the shape of the lateral closing sheets (42) designed so that a significant volume of products can cross the opening (11) of the casing (10) and be moved fluidly toward the knives (20). Each branch (41) thus participates in that fluidity, said products being able to easily slide along the branches (41).

It can be seen on FIG. 6 that the concave part (50) for example comprises an inner fold placed facing the small width (44) of the portion (43) and that the convex part (51) comprises an outer fold placed facing the large width (45) of the portion (43). Thus, the concave part (50) results from the folding of the branch (41) to form said inner fold, while the adjacent convex part (51) results from the folding of that same branch (41) to form said outer fold. FIG. 6 also shows that said folds are separated by a branch portion (41) placed facing the substantially trapezoidal portion (43).

Preferably, the large width (45) is substantially equal to at least two times the small width (44), which gives a blade (19) of large section. Thus, that blade (19) can move a large quantity of products to the corresponding row of knives (20) and can generate a significant blowing effect.

At least one branch (41) advantageously comprises an apex (52) remote from the central part (40). The apex (52) comprises a hole (53) passed through by the fastening axis (22) around which at least one knife (20) is pivotably mounted.

According to one preferred arrangement, facing the branch (41) apex (52), the disc (18) comprises another hole (54) substantially coaxial with the hole (53) and also passed through by the fastening axis (22).

The fastening axis (22) is therefore solidly carried at both of its ends. It can, without break risk, carry a large number of large knives (20), for example nine to twelve knives. Such a number allows quick and regular chopping of the products. Due to their high inertia, large knives (20) have a particularly advantageous flail effect that effectively opposes the resistive forces generated by dense and/or wet products. The large dimensions of the knives (20) are in particular shown by FIG. 5. In that figure, one can see that the knives (20) have a width close to that of the branches (41) of the plate (39).

Figure 7:
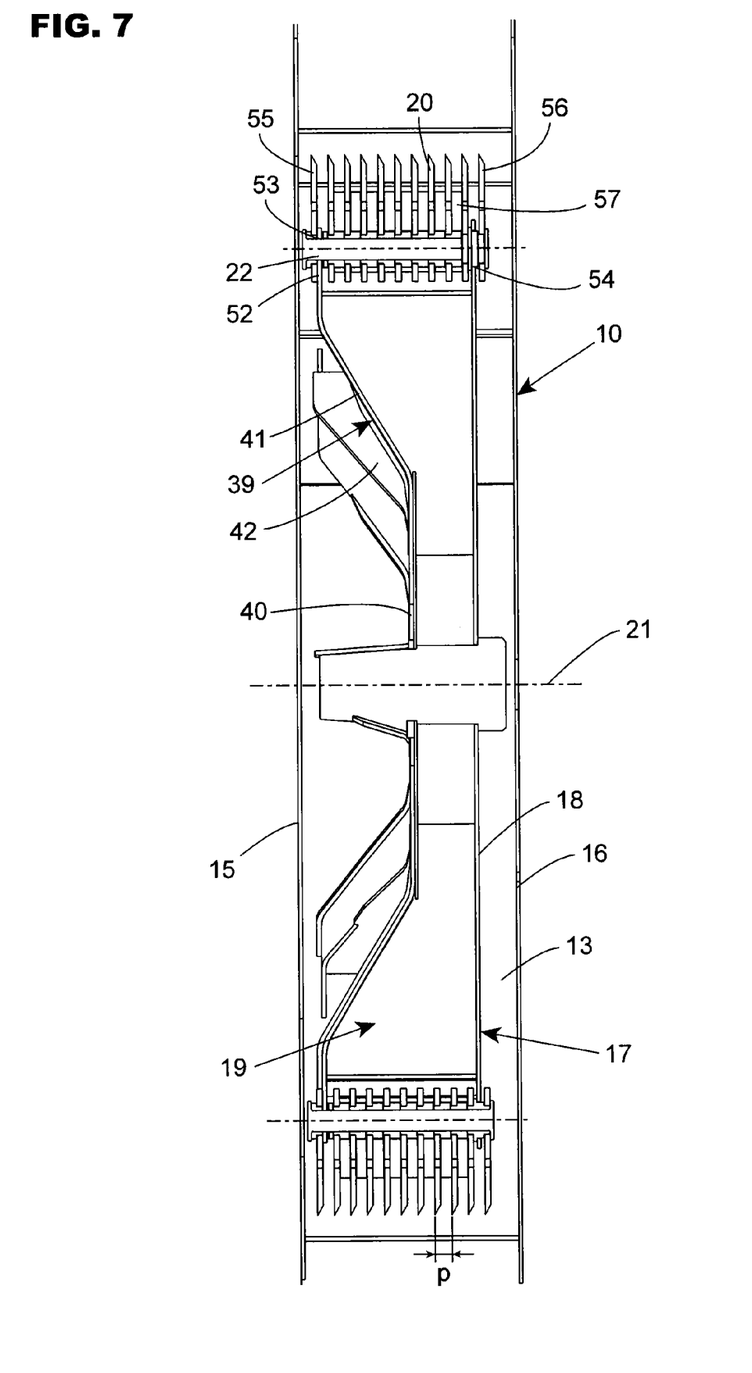
FIG. 7 shows a view of the casing and of the turbine, in cross-section in a plane passing through the rotation axis.

As can in particular be seen on FIG. 7, at least one fastening axis (22), in particular each fastening axis (22), carries a row of knives (20) pivotably mounted with a first knife (55) and a last knife (56). Preferably, a distance separating the first knife (55) from the last knife (56) is at least equal to the large width (45) of the lateral closing sheet (42). In this way, all of the products sliding along the corresponding blade (19), in particular each respective blade (19), encounter a knife (20, 55, 56). Additionally, the width of the row of knives (20, 55, 56), in particular each row of knives (20, 55, 56), is considerable. Combined with the original shape of the blade (19), which improves the movement of the products, this (these) wide row(s) make(s) it possible to chop a significant volume of dense and/or wet and/or long stranded products quickly and homogenously.

According to an advantageous feature shown in FIG. 7, the first knife (55) is arranged between the corresponding branch (41) apex (52) and the first wall (15) of the casing (10). In this way, the products sliding along the branch (41) up to the corresponding apex (52) are also chopped. This arrangement of the first knife (55) also provides dual chop of the products present in the space of the casing (10) situated between said apex (52) and the first wall (15). Thus, the risk of products accumulating in said space, and the risk of jamming, is reduced. The products thrown outside the casing (10) are more homogenous. The machine (1) consumes less power. It will also be noted that the original design of the turbine (17) with a concave plate (39) comprising a central part (40) remote from the disc (18) and at least one branch (41) provides a regular supply of products to said first knife (55).

Additionally, the last knife (56) can be arranged between the disc (18) and the second wall (16) of the casing (10). This arrangement of the last knife (56) also provides dual chop of the products present in the space of the casing (10) situated between the disc (18) and the second wall (16). Thus, the risk of products accumulating in that space, and the risk of jamming, is reduced. The products thrown outside the casing (10) are more homogenous. The machine (1) consumes less power.

Preferably, two successive knives (20, 55, 56) of the row of knives are separated by a substantially constant pitch (p), so as to ensure regular chopping of the products over the width of the row of knives (20, 55, 56).

The first knife (55) is advantageously placed at a distance from the first wall (15) substantially equal to the pitch (p). The last knife (56) can also be placed at a distance from the second wall (16) at least equal to the pitch (p). Thus, the products are chopped over a large width nearly equal to that of the casing (10). The products present between a branch (41) apex (52) and the first wall (15) of the casing (10) are fully dual chopped. The same is true of the products present between the disc (18) and the second wall (16). The risk of accumulation or jamming of products in those spaces is therefore considerably reduced.

As shown in FIG. 7, the last knife (56) is preferably placed at a distance from the second wall (16) of the casing (10) comprised between one and two times the pitch (p) between the other knives (20, 55).

Preferably, the knives (20) placed between the apex (52) and the disc (18) are separated by spacers (57) pivotably mounted on the fastening axis (22) and shown in FIG. 7. These spacers (57) reduce the free section between the corresponding knives (20), and therefore increase the speed of the airflow generated by the rotating turbine (17). The products are thrown out of the machine (1) over a greater distance.

Preferably, a length of each spacer (57) measured in a substantially radial direction of the disc (18) is substantially equal to half of a length of the knives (20) measured in the same direction.

The outlet orifice (12) of the casing (10) shown in FIG. 5 is delimited by the first wall (15), the second wall (16) and a product recycling sheet (58). This recycling sheet (58)

comprises a lower end (59) and an upper end (60). The lower end (59) is close to a trajectory of the knives (20, 55, 56) around the rotation axis (21). The upper end (60) is remote from said trajectory. During one revolution of the turbine (17), a lighter and/or sufficiently chopped portion of the products is thrown out through the outlet orifice (12). The other denser and/or insufficiently chopped portion falls back between the knives (20, 55, 56) and the recycling sheet (58) instead of being thrown out. The arrangement of the lower and upper ends (59, 60) relative to the trajectory of the knives (20, 55, 56) yields a funnel effect that forces the products to be taken back by the knives (20, 55, 56) until they are light enough and/or chopped into strands short enough to be thrown out. In fact, this recycling sheet (58) reduces the risk of the densest products accumulating at the outlet orifice (12), and contributes to homogenous chopping of all of the products introduced into the casing (10).

Preferably, the upper end (60) of the recycling sheet (58) is connected to the discharge chute (14) for the products. Thus, the products that cross the outlet orifice (12) penetrate the discharge chute (14) to be distributed for example in the form of bedding or fodder.

According to an advantageous feature of the invention which can be seen on FIG. 5, a first guidance sheet (62) leans against the first wall (15) of the casing (10). The first guidance sheet (62) is arranged between the turbine (17) and the outlet orifice (12) of the casing (10). The function of this guidance sheet (62) is to prevent the products arriving from the bucket (2) and crossing the opening (11) of the casing (10) from being thrown out without first being taken back by the turbine (17) to be chopped. To that end, this first guidance sheet (62) has a size, measured along the rotation axis (21), substantially equal to the pitch (p) between the knives (20, 55, 56). It does not limit the flow rate of the products.

Similarly, a second guidance sheet (63) advantageously leans against the second wall (16) of the casing (10). The second guidance sheet (63) is arranged between the turbine (17) and the outlet orifice (12) of the casing (10), and has a size, measured along the rotation axis (21), at least equal to the pitch (p) between the knives (20, 55, 56). In this way, the distance separating the two guidance sheets (62, 63) is substantially equal to the distance separating the first knife (55) from the last knife (56). The two guidance sheets (62, 63) do not limit the flow rate of the chopped products which have to be thrown out.

Preferably, the first guidance sheet (62) and/or the second guidance sheet (63) have a curve radius slightly larger than the radius of the trajectory of the knives (20, 55, 56) around the rotation axis (21). Thus, the two guidance sheets (62, 63) follow the trajectory of the knives (20, 55, 56) at a small distance therefrom, preventing products from passing between said sheets (62, 63) and the knives (20, 55, 56).

The first guidance sheet (62) and the second guidance sheet (63) each have a lower portion (64). The respective lower portions (64) can be connected by a horizontal metal sheet (65), shown in FIG. 5, which makes it possible to slow down the long strands so that they fall between the turbine (17) and the recycling sheet (58). In this way, they are chopped until they are short enough.

Each row of knives (20, 55, 56) cooperates with the counter knives (23, 24), and in particular with the adjustable counter knife (24) shown in FIG. 5. The adjustment of the latter is carried out by means of an adjustment device (66). The latter can be manual, or comprise a hydraulic jack connected to a remote control unit of the machine (1). Said jack is connected to the hydraulic device of the tractor (5) by means of pipes. The control unit can be placed in the cab of the tractor (5) from which the position of the adjustable counter knife (24) can be adjusted. Depending on the products, the user can easily vary the distance between the adjustable counter knife (24) and the knives (20, 55, 56) of the turbine (17), and thus determine the intensity of the chopping.

During work, the bucket (2) can be loaded with fodder or straw in bulk or in the form of bales or blocks. For direct distribution, the machine (1) is brought to the distribution location using the tractor (5). Next, the turbine (17) and the unraveling drum (27) are driven in rotation. The drum (27) rotates from bottom to top over its rear half, i.e., in the direction indicated by the arrow (F). When the bucket (2) is loaded with a bale or when the products are dense and/or wet, the deflecting wall (33) and the retaining elements (32) are brought closer to the unraveling drum (27) in the first position. The knives (28) and the coil segments (29) of the unraveling drum (27) detach a certain quantity of products from the mass contained in the bucket (2) and cause it to pass into the casing (10). The products withdrawn by the unraveling drum (27) enter the passage between the latter and the deflecting wall (33). The retaining elements (32) retain the products in the bucket (2) and prevent the large bundles of product from accessing the opening (11) of the casing (10). These bundles slide upward along the rear parts of those elements (32) and along the screen (37) and fall back into the bucket (2). The spacing between the retaining elements (32) is sufficient not to hinder the passage of correctly unraveled products. During the rotation of the unraveling drum (27), its coil segments (29) stir and drive the products to prevent an arch from forming. The products thus arrive in the turbine (17) regularly. In the presence of straw or dry and light products, the deflecting wall (33) and the retaining elements (32) are moved away from the unraveling drum (27) in the second position by means of the adjustment system (36). The products are then no longer stopped by the retaining elements (32). They rush into the passage that is more open between the unraveling drum (27) and the deflecting wall (33). The latter orients those products toward the front half of the unraveling drum (27), where they are cut by the knives (28), so as to be able to pass between the front ends of the retaining elements (32). Said cut products then reach the turbine (17). The latter is able to homogenously chop, over the entire width of the casing (10), a significant volume of these various aforementioned products, which are more or less difficult to work. The configuration of the casing (10) with the guidance sheet(s) (62, 63), the recycling sheet (58) and the horizontal sheet (65) contribute to the quality of the chopping, in particular of dense products and/or long-stranded products. Owing to its original design, the turbine (17) deforms little during work. The turbine (17) next throws out the dual chopped products through the outlet orifice (12). The product can then be oriented by means of the discharge chute (14) toward the troughs, when it involves feed, or toward the bedding, when it involves straw. The discharge chute (14) can also be oriented so as to form a heap of chopped products so that they can subsequently be incorporated into a machine such as a mixer. The machine (1) according to the invention can also be used for lagoon bedding or distribution of chopped products on the ground to form a cover. Outside the first and second positions of the deflecting wall (33), the adjustment system (36) also allows intermediate positions based on the nature of the products.

In order to mix different products loaded in the bucket (2) before they are distributed, the unraveling drum (27) and the turbine (17) are driven in rotation as previously described.

The deflecting wall (33) is moved into the second position by pivoting around its articulation axis (35) by means of the adjustment system (36). The retaining elements (32) pivot with said wall (33) and are situated above the front half of the unraveling drum (27) and at a certain distance above the trajectory of the knives (28). The bundles of products are no longer stopped by the retaining elements (32). They rush into the passage that is more open between the unraveling drum (27) and the deflecting wall (33). This latter orients these products toward the front half of the unraveling drum (27), where they are cut by the knives (28), in order to be able to pass between the retaining elements (32). The screen (37) prevents the upward projection of the products and guides them toward the passage between the deflecting wall (33) and the unraveling drum (27). Said cut products then reach the turbine (17), which throws them out via the discharge chute (14), which is oriented toward the rear, so that they fall back into the bucket (2) and mix. These products can thus pass through the unraveling drum (27) and the turbine (17) two or three times, so as to obtain a completely homogenous mixture. Next, the orientation of the discharge chute (14) can be modified to project products into the troughs.

Based on the position of the adjustable counter knife (24), the machine (1) can chop straw into short strands of three to five centimeters, grind difficult product such as wet straw or hay into long strands from five to ten centimeters, or throw out the products practically without dual chopping them.

The invention is of course not limited to the example embodiment described above and shown in the appended figures. Modifications remain possible, in particular regarding the composition or number of the various elements or by substituting technical equivalents, without going beyond the scope of protection.

The invention claimed is:

1. A machine for distribution of products for feeding or bedding of animals, comprising:
   a bucket including an opening for passage of the products toward a casing comprising a first wall adjacent to the opening and a second wall remote from the first wall;
   in which casing a turbine is mounted that can rotate around a rotation axis;
   the turbine comprising a disc with blades and knives, a plate oriented toward the opening and remote from the disc, and a central part remote from the disc and at least one branch, the at least one branch includes an extension that extends from the central part in a substantially radial direction of the disc, the at least one branch of the plate is connected to the disc by two lateral closing sheets to form a bin, and at least one blade of the turbine is formed by the bin.

2. A distribution machine according to claim 1, wherein the plate comprises a plurality of branches, each branch extends from the central part in a substantially radial direction of the disc, each branch of the plate is connected to the disc by two lateral closing sheets to form a bin, and each blade of the turbine is formed by the bin.

3. A distribution machine according to claim 2, wherein each branch comprises, seen from the opening, a concave part adjacent to the central part and a convex part adjacent to the knives, such that, seen from the opening, the plate has a substantially concave shape.

4. A distribution machine according to claim 1, wherein the knives are arranged in the extension of the blades.

5. A distribution machine according to claim 1, wherein each lateral closing sheet comprises a portion, the portion includes an extension that extends between the disc and the corresponding branch, and between a small width adjacent to the rotation axis and a large width adjacent to the knives, and the large width is larger than the small width.

6. A distribution method according to claim 5, wherein at least one branch comprises, seen from the opening, a concave part adjacent to the central part and a convex part adjacent to the knives, and wherein the concave part comprises an inner fold placed facing the small width of the portion and the convex part comprises an outer fold placed facing the large width of the portion.

7. A distribution machine according to claim 5, wherein the large width is substantially equal to at least two times the small width.

8. A distribution machine according to claim 5, wherein each portion has a substantially trapezoidal shape.

9. A distribution machine according to claim 5, wherein each lateral closing sheet comprises an inner portion situated in the extension of the portion, and the inner portion is connected to the portion by the small width and extends to the central part of the plate.

10. A distribution machine according to claim 9, wherein each inner portion is substantially rectangular.

11. A distribution device according to claim 5, wherein each lateral closing sheet comprises an outer portion situated in the extension of the portion and connected to the portion by the large width.

12. A distribution machine according to claim 11, wherein each outer portion is substantially rectangular.

13. A distribution machine according to claim 1, wherein each lateral closing sheet comprises an end remote from the rotation axis, and ends of the lateral closing sheets of a blade are connected to each other by a closing plate.

14. A distribution machine according to claim 13, wherein the lateral closing sheet strikes the products inserted into the casing due to effect of a rotation of the turbine, and comprises an edge protruding the closing plate.

15. A distribution machine according to claim 1, wherein the at least one branch comprises, seen from the opening, a concave part adjacent to the central part and a convex part adjacent to the knives.

16. A distribution machine according to claim 1, wherein the at least one branch comprises an apex remote from the central part, and the apex comprises a hole passed through by a fastening axis around which at least one knife is pivotably mounted.

17. A distribution machine according to claim 16, wherein the fastening axis carries a row of knives with a first knife and a last knife, and a distance separating the first knife from the last knife is at least equal to the large width.

18. A distribution machine according to claim 17, wherein the first knife is arranged between the corresponding branch apex and the first wall of the casing.

19. A distribution machine according to claim 17, wherein the last knife is arranged between the disc and the second wall of the casing.

* * * * *